United States Patent

[11] 3,576,487

| [72] | Inventor | Robert F. Chase |
| | | Lynchburg, Va. |
| [21] | Appl. No. | 887,030 |
| [22] | Filed | Dec. 22, 1969 |
| [45] | Patented | Apr. 27, 1971 |
| [73] | Assignee | General Electric Company |

[54] BATTERY CHARGING CIRCUIT UTILIZING MULTIVIBRATOR LOCKING MEANS
9 Claims, 3 Drawing Figs.

[52] U.S. Cl. ................................................ 320/39,
320/21, 320/31, 320/37, 323/20
[51] Int. Cl. ........................................................ H02j 7/10
[50] Field of Search ............................................. 320/ (TD),
39, 40, 21, 311, 37, 38; 323/20

[56] References Cited
UNITED STATES PATENTS

| 3,111,617 | 11/1963 | Cady ............................ | 320/39 |
| 3,348,060 | 10/1967 | Jamieson ..................... | 320/39X |
| 3,363,162 | 1/1968 | Bawden ........................ | 320/TD(UX) |
| 3,383,584 | 5/1968 | Atherton ...................... | 320/39X |

*Primary Examiner*—J. D. Miller
*Assistant Examiner*—John M. Gunther
*Attorneys*—James J. Williams, Frank L. Neuhauser, Oscar B. Waddell and Joseph B. Forman ABSTRACT: A battery charger utilizes a switch which is alternately opened and closed by a multivibrator. When the switch is closed, the battery receives a charging current. When the switch is open, the battery voltage is sensed. If the sensed battery voltage exceeds a selected magnitude, the multivibrator is locked so that the switch remains open.

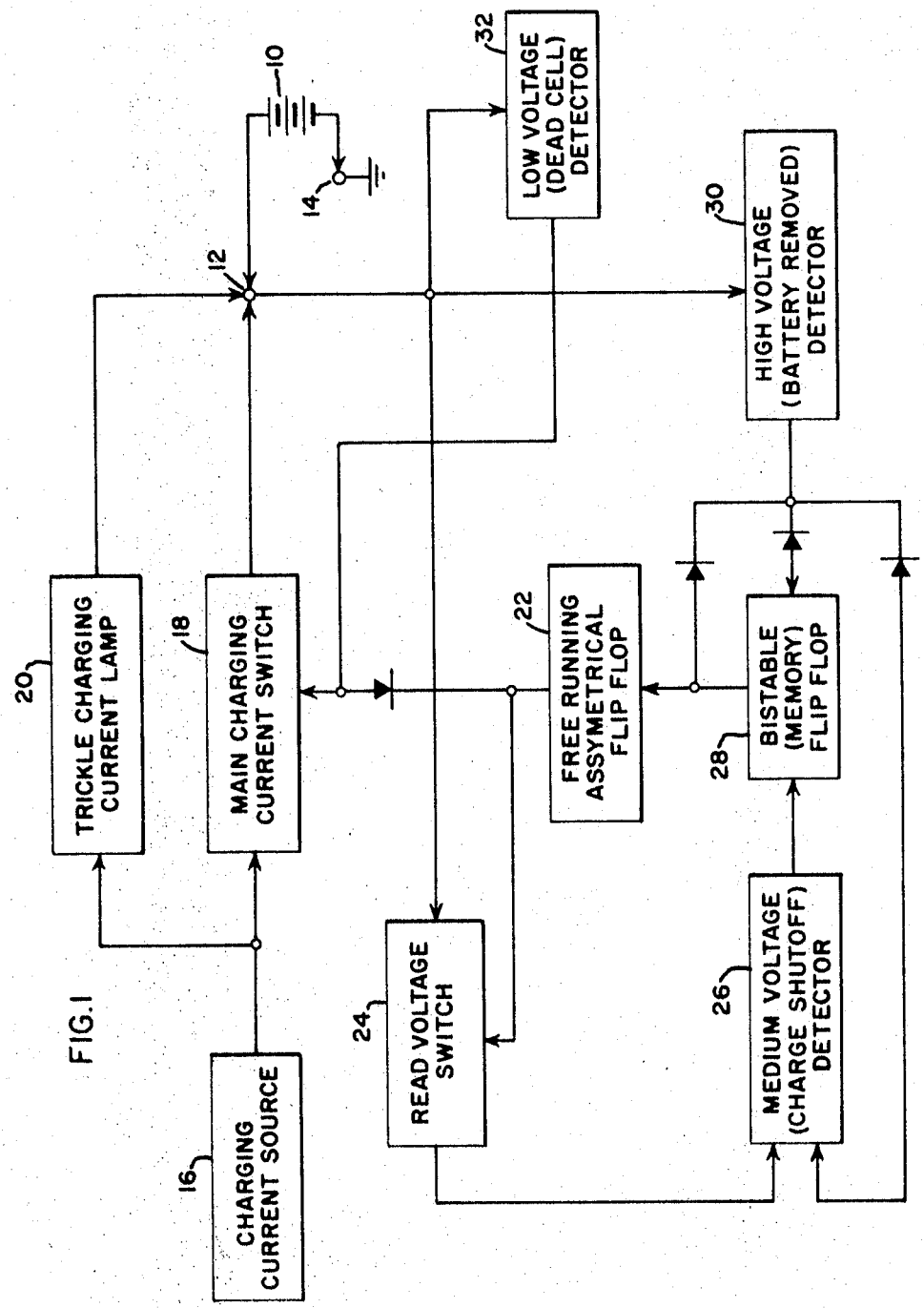

3,576,487

BATTERY CHARGING CIRCUIT UTILIZING MULTIVIBRATOR LOCKING MEANS

BACKGROUND OF THE INVENTION

My invention relates to a battery-charging circuit, and particularly to a battery-charging circuit for rapidly charging nickel-cadmium and similar storage batteries.

Nickel-cadmium and similar storage batteries are used in many applications requiring a source of portable electrical energy. Typically, such applications require that a discharged battery be quickly recharged to a useful condition or state. However, because such batteries tend to become heated with charging, it is also necessary that the batteries be protected from becoming too hot during charging, so as to avoid damaging or destroying the battery.

Accordingly, an object of my invention is to provide a new and improved charging circuit for nickel-cadmium and similar storage batteries.

Another object of my invention is to provide a new and improved battery-charging circuit that protects the battery from being damaged during charging.

The voltage of a nickel-cadmium or similar battery is a good indication of its charge state, and also of its temperature during charging. If the voltage can be accurately read or indicated, then it is possible to charge the battery rapidly to a selected state, and then to provide a trickle charge, if desired, to bring the battery to a full charge.

Accordingly, another object of my invention is to provide a circuit that rapidly charges a storage battery in pulses; that senses the battery voltage between such pulses; that stops the rapid charging if a selected voltage magnitude is sensed; and that then provides a trickle charge if desired.

SUMMARY OF THE INVENTION

Briefly, these and other objects are achieved in accordance with my invention by a battery-charging circuit having a switch for connecting a charging current source to a battery, or for connecting a voltage sensor to the battery. The switch is alternately closed and opened by a free-running multivibrator. When the switch is closed, the current source is connected to the battery. When the switch is open, the voltage sensor is connected to the battery. If the sensed voltage exceeds a selected magnitude, the multivibrator is locked so that the switch remains open. Thereafter, a trickle charge may be provided. The multivibrator may be unlocked for a subsequent charge by removal of the battery from the charging circuit. My charging circuit also includes means for sensing a low battery voltage, typically indicating a defective cell, and for opening the switch if the sensed voltage is below a selected magnitude. Thus, my charging circuit may provide a battery with a high charge in a relatively short time, but without danger of harm or damage to the battery.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 1 shows a block diagram of a preferred embodiment of a battery-charging circuit in accordance with my invention.

BRIEF DESCRIPTION OF PREFERRED EMBODIMENT

Figure 2A:
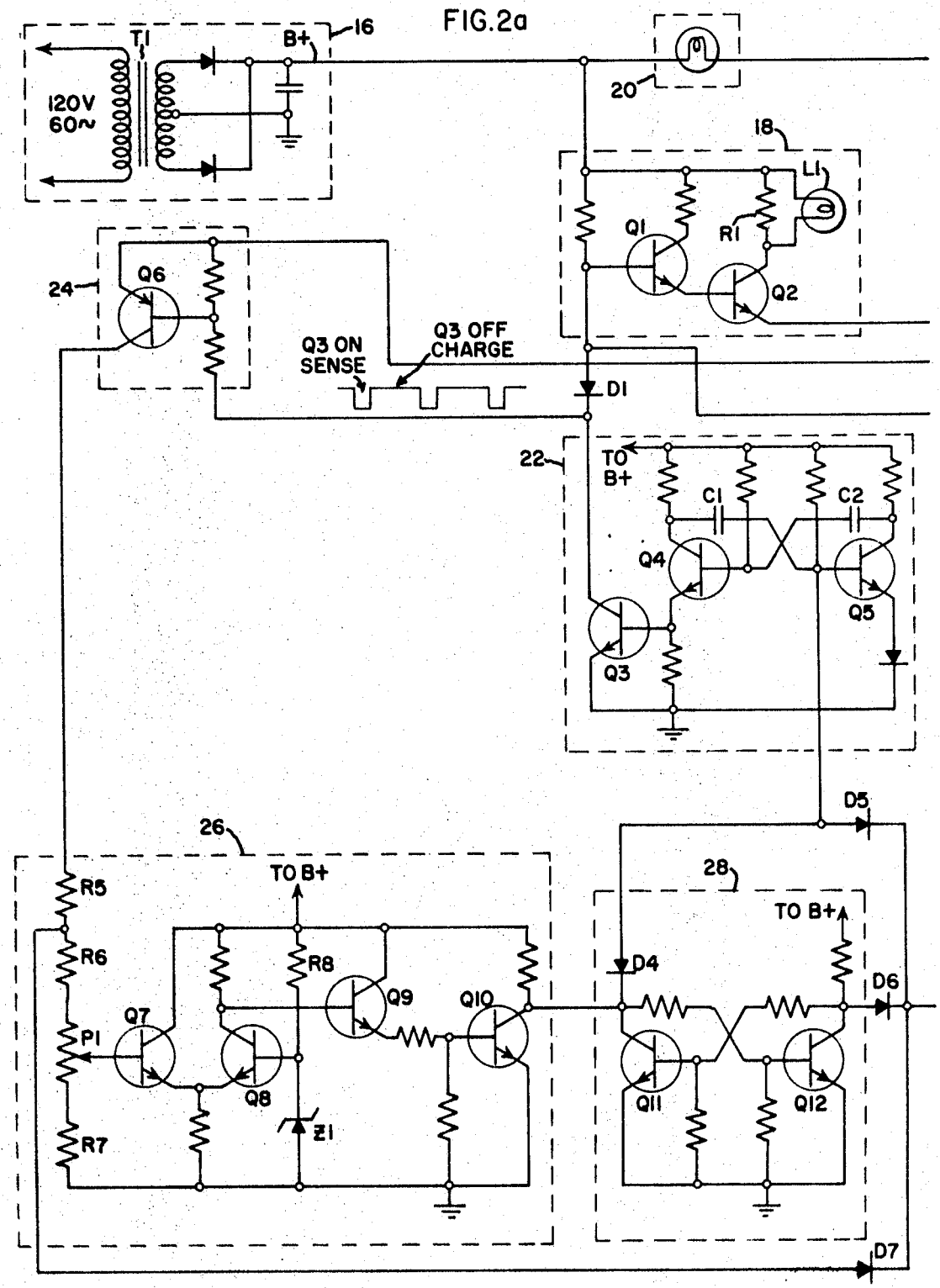
FIGS. 2a and 2b show a more complete schematic diagram of the battery-charging circuit shown in FIG. 1.

In FIG. 1, I have shown a battery 10, which may be a nickel-cadmium or similar type battery to be charged. Such a battery may have a number of cells, each of which has a nominal open circuit voltage of 1.25 volts. When the battery 10 is discharged, the nominal open circuit voltage of each cell is less than this, for example, in the order of 1.10 volts. The battery 10 is connected to my charging circuit at suitable terminals 12, 14. The terminal 14 may be connected to a point of reference potential 14 may be connected to a point of reference potential such as ground. The terminal 12 is supplied with charging current from a suitable current source 16 through a main charging current switch 18. The switch 18 is alternately opened and closed to provide a main charging current to the terminal 12 and to the battery 10. The source 16 is also connected to the terminal 12 through a trickle-charging current lamp 20 so that a connected battery always receives a trickle-charging current. The switch 18 is alternately opened and closed by a free-running, asymmetrical multivibrator or flip-flop 22. I prefer that the multivibrator or flip-flop 22 be asymmetrical so that the switch 18 is closed for a longer period than it is open during one switching cycle. For example, the switch 18 is preferably closed for 4 milliseconds, and is then open for 1 millisecond. During the time that the switch 18 is closed, it connects the source 16 to the terminal 12 and to the battery 10, so as to provide a main charging current to the battery 10. During the time that the switch 18 is open, the voltage at the terminal 12 is applied by a read voltage switch 24 to a medium voltage (charge shutoff) detector 26. The switch 24 is operated by the flip-flop 22 and connects the terminal 12 to the detector 26 during the time the main switch 18 is open. If the detector 26 detects or senses a voltage which exceeds a selected magnitude, it produces a locking signal that is applied to a bistable or memory flip-flop or multivibrator 28. The condition of the flip-flop 28 is supplied to the flip-flop 22 to lock the flip-flop 22 in the condition such that the main switch 18 is held open. Thereafter, the battery 10 cannot receive a main charging current, and hence is protected. However, the battery 10 can continue to receive a trickle-charging current until the battery 10 is removed from the circuit.

When the battery 10 is removed, a high voltage (battery-removed) detector 30 detects a relatively high voltage (substantially equal to the voltage of the charging source) applied to the terminal 12 by the trickle-charging current lamp 20. When this relatively high voltage is detected, the detector 30 produces an unlocking signal which is applied to the flip-flop 28. The condition of the flip-flop 28 is supplied to the flip-flop 22 to unlock the flip-flop 22 so that the main switch 18 can again be opened and closed. Thus, my circuit prevents a battery from receiving an inadvertent main charging current without first removing the battery and then reinserting it. A low voltage (dead cell) detector 32 is also connected to the terminal 12 to detect a total battery voltage which is below a selected magnitude. If such a voltage is sensed or detected, the detector 32 applies a signal to the main charging current switch 18 to lock the switch 18 in the open position, since a main charging current would normally not restore a battery with a dead or defective cell. Thus, a user can be provided with an indication that the battery he is attempting to charge is defective because of an abnormally low battery voltage.

DETAILED DESCRIPTION OF THE PREFERRED EMBODIMENT

Figure 2B:
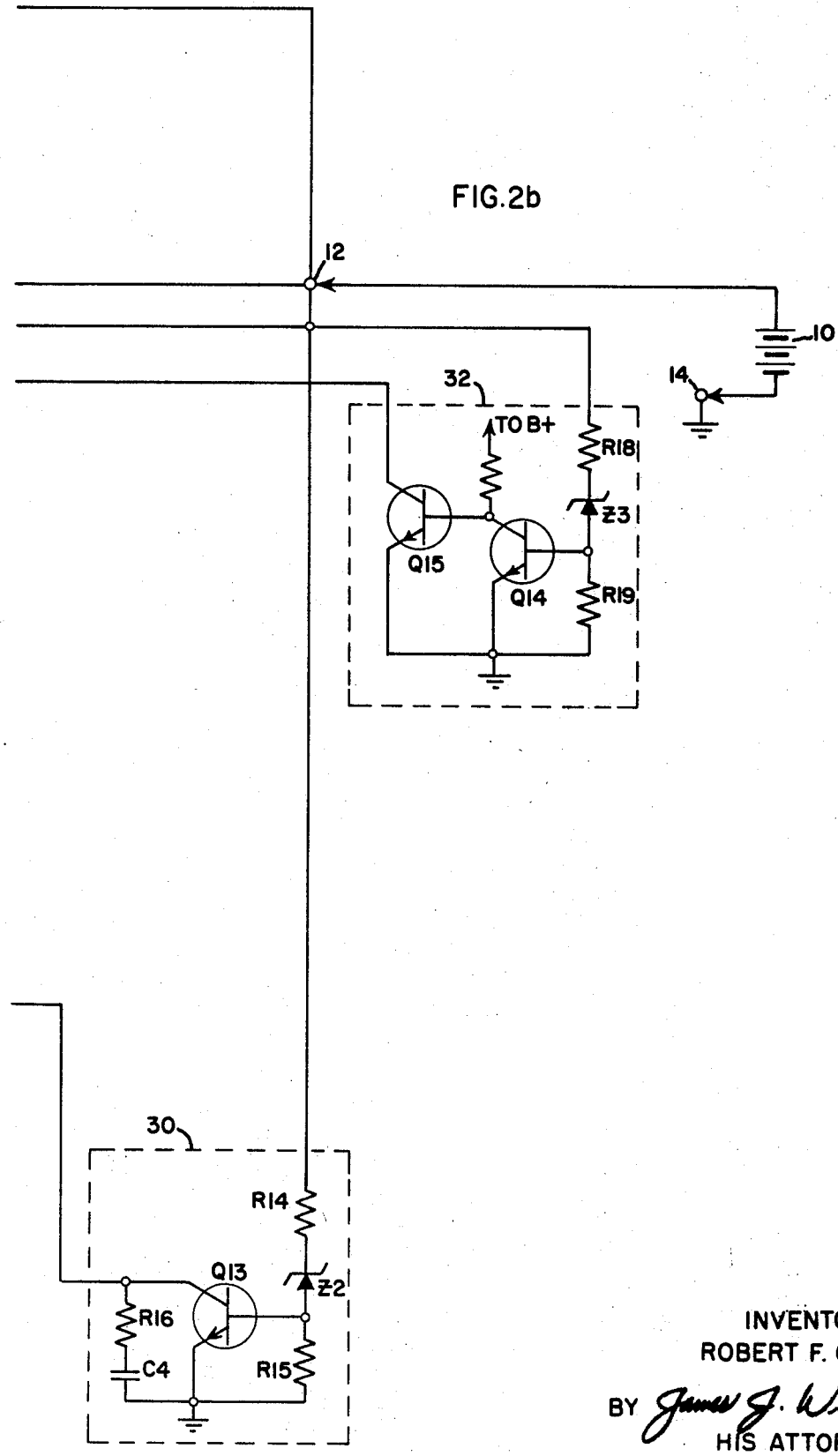

A more complete schematic diagram of my battery-charging circuit of FIG. 1 is shown in FIGS. 2a and 2b. This diagram is shown on two sheets in order to provide sufficient space for clarity. However, it is to be understood that the diagram is to be considered with the lines or leads at the right of FIG. 2a connected to the correspondingly positioned lines or leads at the left of FIG. 2b. In FIGS. 2a and 2b, the blocks of FIG. 1 are indicated by dashed lines and are given corresponding reference numerals. Not all of the components are labeled in these FIGS. in order to keep the FIGS. as clear as possible.

The charging current source 16 may comprise a transformer T1 having its primary connected to a suitable source of potential, such as 120 volts, 60 cycles. The secondary of the transformer T1 is connected to diode rectifiers in conventional full wave fashion, and these in turn are connected to a bus labeled B . The secondary of the transformer T1 is center-tapped and connected to a ground or reference potential. A filter capacitor may be connected between the B+ bus and the ground as shown. This B+ bus and ground are connected to various parts of the circuit as indicated in each of the individual blocks.

The B+ bus is connected to the main charging current switch 18 and to the trickle-charging current lamp 20. The trickle-charging current lamp 20 may be a suitable incandescent lamp which provides suitable current limiting so as to provide the desired trickle current to the terminal 12. The switch 18 comprises two transistors Q1, Q2, which are of the NPN type. The base and the collector of the transistor Q1 are connected through respective resistors to the B+ bus, and the emitter of the transistor Q1 is connected to the base of the transistor Q2 to provide a two-stage amplifier. A relatively small magnitude resistor R1 and incandescent lamp L1 are connected in parallel between the B+ bus and the collector of the transistor Q2 so that when the transistor Q2 conducts, a main charging current is supplied from the B+ bus through the resistor R1 and the lamp L1, and through the collector-emitter path of the transistor Q2 to the terminal 12 and to the battery 10. The transistor Q1 is biased by its base resistor so that the transistor Q1 normally conducts, and so that it, in turn, causes the transistor Q2 to conduct. As will be explained, the base of the transistor Q1 is connected to other circuits which control whether the transistor Q1 is conducting or nonconducting.

One connection for the base of the transistor Q1 is through an isolating diode rectifier D1 to the free-running flip-flop 22. This connection is made to the collector of an NPN-type transistor Q3, which serves as an output or amplifier transistor for the flip-flop 22. The flip-flop 22 includes transistors Q4, Q5, which are regeneratively connected by capacitors C1, C2 to provide a conventional free-running multivibrator or flip-flop. The time constants for the multivibrator are arranged so that the transistor Q4 is on or conducts for a relatively short time (for example, 1 millisecond), and so that the transistor Q5 is on or conducts (hence, Q4 is off) for a relatively long time (for example, 4 milliseconds). When the transistor Q4 conducts, the transistor Q3 also conducts. This reduces the base voltage of the transistor Q1 to a relatively low potential. Under this condition, the switch 18 is open. When the transistor Q4 is off, the transistor Q3 is also off so that the transistor Q1 can conduct. Under this condition, the switch 18 is closed. The base of the transistor Q5 is connected to the bistable (memory) flip-flop 28 and to the medium voltage detector 30 for control functions which will be subsequently explained.

The collector of the transistor Q3 is connected to the read voltage switch 24, which comprises a transistor Q6 of the PNP type. When the transistor Q3 conducts, it places a relatively low voltage on the base of the transistor Q6 to cause the transistor Q6 to conduct. This connects the terminal 12 through the emitter-collector path of the transistor Q6 to the medium voltage (charge shutoff) detector 26. When the transistor Q3 is off, it permits the B+ voltage to be applied to the base of the transistor Q6 to turn the transistor Q6 off.

The operation or function of the flip-flop 22 is indicated by the waveform positioned to the left of the diode D1. This waveform represents the voltage changes at the collector of the transistor Q3, and hence the state of the flip-flop 22. As shown by this waveform, when the transistor Q3 is on or conducts, its collector is at a relatively low voltage. This relatively low voltage opens the main current switch 18 and closes the read voltage switch 24 so that battery voltage may be sensed or read. When the transistor Q3 is off or nonconducting, its collector is at a relatively high voltage. This permits the transistor Q1 to conduct, so that the switch 18 is closed to provide a charging current, and also causes the transistor Q6 to be turned off so that no voltage is read or sensed. Thus, my circuit as described thus far provides a charging current, and also provides means for sensing the voltage on the battery while no charging current is being supplied. This provides a more accurate indication of true battery voltage, and reduces or eliminates any effect of contact resistance between the battery and the charging terminals, or other similar conditions.

The collector of the transistor Q6 is connected to one end of a voltage divider circuit in the medium voltage detector 26. The voltage divider comprises a resistor R5, a temperature-compensated resistor R6, a potentiometer P1, and a resistor R7. The movable tap of the potentiometer P1 is connected to the base of a NPN-type transistor Q7. The transistor Q7 is connected with a common emitter resistor to an NPN-type transistor Q8. A voltage reference circuit comprising a resistor R8 and a Zener diode rectifier Z1 are provided for the transistor Q8. When the voltage delivered by the tap of the potentiometer P1 to the base of the transistor Q7 exceeds the voltage at the base of the transistor Q8, the transistor Q8 is turned off. The output of the transistor Q8 is derived at its collector and applied to the base of an NPN-type transistor Q9. The output of the transistor Q9 is derived at its emitter and applied to the base of an NPN-type transistor Q9, Q10 are turned on so that the collector voltage of the transistor Q10 approaches zero. This low voltage is applied to the flip-flop 28, and is also applied through a diode rectifier D4 to the base of the transistor Q5 in the free-running flip-flop 22. The free-running flip-flop 22 becomes locked with the transistor Q5 turned off and the transistor Q4 turned on. (The bistable flip-flop 28 also becomes set or locked.) As was explained earlier, when the transistor Q4 is on, the transistor Q3 is also on and opens the switch 18. Thus, when a battery voltage of selected magnitude is sensed, the switch 18 opens so that the battery does not receive further main charging current. However, the battery can receive trickle-charging current.

The low voltage at the collector of the transistor Q10 is also applied to the bistable flip-flop 28, which comprises two NPN-type transistors Q11, Q12, coupled in conventional bistable fashion. This low voltage is applied to the base of the transistor Q12 to turn the transistor Q12 off and turn the transistor Q11 on. This is the set condition for the flip-flop 28. In this condition, the collector of the transistor Q11 is at a relatively low voltage. This insures that the transistor Q5 remains turned off and the transistor Q4 remains on, even if conditions subsequently change in the medium voltage detector 26. Thus, the free-running flip-flop 22 is kept locked so that the switch 18 is kept open. The bistable flip-flop 28 cannot be reset or unlocked except by a low voltage pulse which is supplied through an isolation diode rectifier D6 from the high voltage detector 30, as will be explained.

The high voltage detector 30 comprises a resistor R14, a Zener diode rectifier Z2, and a resistor R15 coupled to provide a suitable voltage divider. A connection is made from this voltage divider to the base of an NPN-type transistor Q13. A time delay circuit comprising a resistor R16 and a capacitor C4 is connected between the collector and emitter of the transistor Q13. The collector of the transistor Q13 is connected to three parts of the battery-charging circuit. One connection is made through an isolation diode rectifier D5 to the base of the transistor Q5 in the free-running flip-flop 22. A second connection is made through the isolation diode rectifier D6 to the collector of the transistor Q12 in the bistable flip-flop 28. And a third connection is made through an isolation diode rectifier D7 to the voltage divider in the medium voltage detector 26. When the detector 30 senses a voltage exceeding a selected magnitude determined by the voltage divider R14, Z2, R15, the transistor Q13 is turned on. (This voltage is usually produced when the battery is removed because of the connection to the B+ bus provided by the trickle-charging lamp 20.) When the transistor Q13 is turned on, its collector voltage drops toward zero. This low voltage is passed by the diodes D5, D6, D7 to respective circuits. In the flip-flop 22, the low voltage holds the transistor Q5 off as long as the high-voltage condition remains. If another battery is placed in the charging circuit, the low voltage remains until the capacitor C4 can charge through the resistor R16. This time delay (100 milliseconds, for example) is provided so that the low voltage detector 32 can have time to function. In the flip-flop 28, the low voltage is applied to the base of the transistor Q11 to turn the transistor Q11 off, and and to turn the transistor Q12 on. This is the reset condition for the flip-flop 28. In this condition, the collector of the transistor Q11 is relatively positive so that if the detector 30 does not detect high voltage, the flip-flop 22 can begin to operate in the free-running condition. Without the low voltage supplied through the diode D5, resetting or unlocking the flip-flop 28 would permit the flip-flop 22 to run. In such a case, if a battery were placed in the charging circuit, main charging current and a relatively high voltage pulse would be produced immediately, and this might prevent the low voltage detector 32 from functioning properly. In the detector 26, the low voltage shunts any high voltage at the read switch 24 so that the detector 26 cannot attempt to set and lock the flip-flop 28 at the same time.

When another battery is inserted in the circuit for charging, its lower voltage turns the high voltage detector transistor 13 off. This disconnects the collector of that transistor 13 from ground so that the flip-flop 22 is able to continue its free-running condition, the detector 26 is able to detect again, and the flip-flop 28 can become set by an appropriate signal. When the battery receives sufficient charge, its voltage causes the detector 26 to set the flip-flop 28, and halt the flip-flop 22, as already described.

My battery-charging circuit may also be provided with the low voltage (dead-cell) detector 32. The detector 32 comprises two NPN-type transistors Q14, Q15 connected as a two-stage amplifier. The input to the detector 32 is coupled to a voltage divider circuit comprising a resistor R18, a Zener diode rectifier Z3, and a resistor $R19. A suitable voltage is derived from this voltage divider and applied to the base of the transistor Q4. The collector of the transistor Q4 is connected to the base of the transistor Q15, and the collector of the transistor Q15 is connected to the base of the transistor Q1 in the main switch. If the voltage on a battery 10 is insufficient to cause conduction through the Zener diode Z3 (typically indicating one or more defective cells), the transistor Q14 is turned off. This causes the transistor Q15 to conduct, with the result that its relatively low collector voltage holds the transistor Q1 turned off. With the transistor Q1 turned off, the switch 18 is held open so that no charging current is supplied. This is a desirable condition, since a battery voltage insufficient to cause breakdown of the Zener diode Z3 indicates that one or more cells in the battery are defective, and such a battery could not receive a proper charge.

It will thus be seen that my battery-charging circuit provides a new and improved device for charging batteries, and at the same time for providing an accurate indication or sensing of the battery voltage. The problem of contact resistance between the battery terminals and the charging terminals is eliminated as far as sensing is concerned, since sensing is performed only during the time that no charging current is applied. This provides a fairly accurate indication of the true battery condition, since there is no voltage drop present due to a heavy charging current. And, my circuit provides means for stopping the charge when a voltage of selected magnitude is sensed, and thereafter providing only a trickle charge. While I have shown only one embodiment of may invention, persons skilled in the art will appreciate that modifications may be made. For example, other pulse generators or oscillators may be provided to replace the typical circuits shown. The low voltage detector 32 may be omitted if desired. However, it is preferable that the high voltage detector be retained in order to reset my charging circuit when a battery is removed. Therefore, while my invention has been described with reference to a particular embodiment, it is to be understood that modifications may be made without departing from the spirit of the invention or form the scope of the claims.

I claim:
1. An improved battery-charging circuit comprising:
   a. a first terminal for connection to a source of charging voltage;
   b. a second terminal for connection to a battery to be charged;
   c. switching means having a current path and having a control terminal for selectively opening and closing said current path;
   d. means connecting said current path between said first and second terminals;
   e. a pulse generator having first and second alternating states indicated at an output terminal;
   f. means connecting said pulse generator output terminal to said switching means control terminal for opening said current path during said first state, and for closing said current path during said second state;
   g. locking means connected to said second terminal and to said pulse generator output terminal and to said pulse generator output terminal for sensing the voltage at said second terminal during said first pulse generator state and producing a locking signal at an output terminal in response to a sensed voltage that exceeds a selected magnitude;
   h. a means connecting said locking means output terminal to said pulse generator for locking said pulse generator in said first state in response to said locking signal, thereby maintaining said current path in an open condition.

2. The improved battery-charging circuit of claim 1, and further comprising a trickle-charging current impedance connected between said first and second terminals.

3. The improved battery-charging circuit of claim 1 wherein said locking means comprise a read switch connected to said second terminal and controlled by said pulse generator, and comprise a voltage detector connected between said read switch and said pulse generator.

4. The improved battery-charging circuit of claim 1 wherein said second pulse generator state is longer than said first multivibrator state.

5. An improved battery-charging circuit comprising:
   a. first and second source terminals for a charging current;
   b. first and second output terminals for a battery to be charged;
   c. means connecting said second source terminal to said second output terminal;
   d. a current switch having a main path and a control terminal;
   e. means connecting said main path between said first source terminal and said first output terminal;
   f. a free-running multivibrator having first and second alternating states indicated at an output terminal;
   g. means connecting said multivibrator output terminal to said current switch control terminal for closing said main path when said multivibrator is in said first state and for opening said main path when said multivibrator is in said second state;
   h. a read switch having input and output terminals that are connected in response to a signal applied to a control terminal;
   i. means connecting said read switch input terminal to said first output terminal and connecting said read switch control terminal to said multivibrator output terminal for connecting said read switch input and output terminals in response to said multivibrator being in said second state;
   j. a voltage detector having an input terminal connected to said read switch output terminal and having an output terminal for producing a locking signal in response to a voltage that exceeds a selected magnitude at said voltage detector input terminal;
   k. means connecting said voltage detector output terminal to said multivibrator for locking said multivibrator in said second state in response to said locking signal, and 1. means connected to said multivibrator, for selectively unlocking said multivibrator.

6. The improved battery-charging circuit of claim 5, and further comprising a a trickle-charging current impedance connected between said first source terminal and said first output terminal.

7. The improved battery-charging circuit of claim 5, and further comprising a low voltage detector having an input terminal connected to said first output terminal and having an output terminal connected to said current switch control terminal for opening said main path when a voltage below a selected magnitude is detected.

8. The improved battery-charging circuit of claim 5 wherein said unlocking means comprise a high voltage detector having an input terminal connected to said first output terminal and having an output terminal connected to said multivibrator for unlocking said multivibrator after a high voltage has been detected.

9. The improved battery-charging circuit of claim 8, and further comprising a low voltage detector having an input terminal connected to said first output terminal and having an output terminal connected to said current switch control terminal for opening said main path when a voltage below a selected magnitude is detected.